United States Patent
Tillman et al.

(10) Patent No.: US 11,326,476 B1
(45) Date of Patent: May 10, 2022

(54) COMPLIANT RETENTION SYSTEM FOR GAS TURBINE ENGINE

(71) Applicant: HONEYWELL INTERNATIONAL INC., Charlotte, NC (US)

(72) Inventors: Donald Tillman, Phoenix, AZ (US); Ryon James Stanley, Phoenix, AZ (US); Courtney Murphy, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/077,079

(22) Filed: Oct. 22, 2020

(51) Int. Cl.
| F01D 11/08 | (2006.01) |
| F01D 25/24 | (2006.01) |
| F01D 9/04 | (2006.01) |
| F01D 11/18 | (2006.01) |
| F01D 11/00 | (2006.01) |

(52) U.S. Cl.
CPC ............ F01D 25/246 (2013.01); F01D 9/04 (2013.01); *F01D 11/005* (2013.01); *F01D 11/08* (2013.01); *F01D 11/18* (2013.01); *F05D 2220/32* (2013.01); *F05D 2240/11* (2013.01); *F05D 2240/12* (2013.01); *F05D 2240/14* (2013.01)

(58) Field of Classification Search
CPC ...... F01D 25/246; F01D 11/08; F01D 11/005; F01D 11/18; F01D 9/04; F05D 2240/11
See application file for complete search history.

(56) References Cited

U.S. PATENT DOCUMENTS

| 6,733,233 | B2 * | 5/2004 | Jasklowski | F01D 11/025 415/135 |
| 8,079,807 | B2 * | 12/2011 | Shapiro | F01D 11/12 415/173.1 |
| 8,246,299 | B2 * | 8/2012 | Razzell | F01D 11/005 415/173.1 |
| 8,579,580 | B2 * | 11/2013 | Albers | F01D 25/243 415/173.1 |
| 8,740,552 | B2 * | 6/2014 | Marusko | F01D 11/122 415/173.1 |
| 8,753,073 | B2 * | 6/2014 | Albers | F01D 25/246 415/139 |
| 8,834,105 | B2 * | 9/2014 | Albers | F01D 25/12 415/173.1 |
| 8,905,709 | B2 * | 12/2014 | Dziech | F01D 11/125 415/173.1 |
| 9,175,579 | B2 * | 11/2015 | Franks | F01D 5/284 |

(Continued)

*Primary Examiner* — Woody A Lee, Jr.
*Assistant Examiner* — Behnoush Haghighian
(74) *Attorney, Agent, or Firm* — Lorenz & Kopf, LLP

(57) ABSTRACT

A system for coupling a shroud to a case associated with a gas turbine engine and a gas turbine engine including such a system includes the case defining a bore and the shroud retained within the case. The shroud defines a pocket. The system includes a pin received through the bore and at least partially positioned within the pocket. The pin has a perimeter. The system includes a load spreader including a first side and a second side opposite the first side. The first side is interconnected to the second side by a flexible portion. The first side, the second side and the flexible portion are received about a portion of the perimeter of the pin, and the load spreader is configured to transmit at least one of an axial point load and a circumferential point load from the pin over a surface of the shroud.

19 Claims, 12 Drawing Sheets

(56) References Cited

U.S. PATENT DOCUMENTS

| | | | |
|---|---|---|---|
| 9,726,043 B2* | 8/2017 | Franks | F01D 11/08 |
| 10,030,542 B2* | 7/2018 | Zurmehly | F01D 11/005 |
| 10,047,624 B2* | 8/2018 | O'Leary | F01D 25/12 |
| 10,094,234 B2* | 10/2018 | O'Leary | F01D 11/10 |
| 10,132,194 B2* | 11/2018 | Vetters | F01D 25/12 |
| 10,184,352 B2* | 1/2019 | O'Leary | F01D 9/02 |
| 10,196,919 B2* | 2/2019 | O'Leary | F01D 11/001 |
| 10,378,387 B2* | 8/2019 | Baldiga | F01D 25/28 |
| 10,465,558 B2* | 11/2019 | Shapiro | F01D 25/246 |
| 10,577,960 B2* | 3/2020 | O'Leary | F01D 25/246 |
| 10,619,514 B2 | 4/2020 | Walston et al. | |
| 10,677,084 B2* | 6/2020 | Smoke | F01D 11/122 |
| 10,711,630 B2* | 7/2020 | Waldman | F01D 11/003 |
| 10,900,378 B2* | 1/2021 | Smoke | F01D 9/04 |
| 11,028,720 B2* | 6/2021 | Tableau | F01D 11/08 |
| 2008/0206046 A1* | 8/2008 | Razzell | F01D 9/04 415/173.1 |
| 2011/0189009 A1* | 8/2011 | Shapiro | F01D 11/12 415/209.3 |
| 2011/0293410 A1* | 12/2011 | Marusko | F01D 11/08 415/173.1 |
| 2011/0318171 A1* | 12/2011 | Albers | F01D 25/246 415/173.1 |
| 2012/0082540 A1* | 4/2012 | Dziech | F01D 11/005 415/173.1 |
| 2012/0171023 A1* | 7/2012 | Albers | F01D 25/243 415/173.1 |
| 2012/0171027 A1* | 7/2012 | Albers | F01D 11/005 415/208.1 |
| 2013/0156550 A1* | 6/2013 | Franks | F01D 25/246 415/126 |
| 2013/0156556 A1* | 6/2013 | Franks | F01D 11/08 415/182.1 |
| 2016/0097303 A1* | 4/2016 | Baldiga | F01D 11/12 416/182 |
| 2016/0376901 A1* | 12/2016 | O'Leary | F01D 9/02 415/116 |
| 2016/0376906 A1* | 12/2016 | O'Leary | F01D 9/04 415/173.1 |
| 2016/0376907 A1* | 12/2016 | O'Leary | F01D 11/001 415/173.3 |
| 2016/0376921 A1* | 12/2016 | O'Leary | F01D 25/12 415/116 |
| 2017/0096911 A1* | 4/2017 | Zurmehly | F01D 9/02 |
| 2017/0114670 A1* | 4/2017 | Shapiro | F01D 25/24 |
| 2017/0175572 A1* | 6/2017 | Vetters | F01D 25/12 |
| 2017/0268359 A1* | 9/2017 | Frey | F01D 11/02 |
| 2018/0149042 A1 | 5/2018 | Freeman et al. | |
| 2018/0245605 A1 | 8/2018 | Dreischarf et al. | |
| 2018/0363486 A1* | 12/2018 | Smoke | F01D 25/12 |
| 2018/0363499 A1* | 12/2018 | Smoke | F01D 9/04 |
| 2018/0371931 A1* | 12/2018 | O'Leary | F01D 9/04 |
| 2019/0292929 A1* | 9/2019 | Waldman | F01D 11/16 |
| 2019/0376404 A1* | 12/2019 | Rice | F01D 25/005 |
| 2020/0055789 A1* | 2/2020 | Smyth | F01D 25/246 |
| 2020/0157963 A1* | 5/2020 | Smyth | C04B 41/5024 |
| 2021/0003025 A1* | 1/2021 | Smoke | F01D 11/005 |
| 2021/0025284 A1* | 1/2021 | Sippel | F01D 25/246 |
| 2021/0108531 A1* | 4/2021 | Vetters | F01D 9/042 |
| 2021/0115806 A1* | 4/2021 | Tableau | F01D 11/08 |
| 2021/0140343 A1* | 5/2021 | Smoke | F01D 5/225 |
| 2021/0148252 A1* | 5/2021 | Freeman | F01D 11/005 |

* cited by examiner

COMPLIANT RETENTION SYSTEM FOR GAS TURBINE ENGINE

STATEMENT REGARDING FEDERALLY SPONSORED RESEARCH OR DEVELOPMENT

This invention was made with Government support under DTFAWA-15-A-80017 awarded by the Federal Aviation Administration. The Government has certain rights in the invention.

TECHNICAL FIELD

The present disclosure generally relates to gas turbine engines, and more particularly relates to a compliant retention system for a shroud associated with a gas turbine engine.

BACKGROUND

Compressor or turbine rotor blade stages in gas turbine engines may be provided with shrouds that maintain tip clearances between the tips of the rotor blades and the shrouds during an operation of the gas turbine engine to improve engine performance. In certain instances, the shrouds may thermally expand or grow radially at a different rate than surrounding components. Depending on how the shroud is coupled within the gas turbine engine, differences in the thermal growth rates may result in misalignment between the shroud and the tips of the rotor blades, which alters the tip clearance and affects efficiency of the compressor or turbine stage. Moreover, depending upon how the shroud is coupled within the gas turbine engine, point loads may be applied to the shroud, which may impact life of the shroud.

Accordingly, it is desirable to provide a compliant retention system for coupling a shroud within a gas turbine engine, such as to an engine case, which reduces point loading on the shroud while maintaining an alignment of the shroud and tip clearance during the operation of the gas turbine engine. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a system for coupling a shroud to a case associated with a gas turbine engine. The system includes the case defining a bore and the shroud retained within the case. The shroud defines a pocket. The system includes a pin received through the bore and at least partially positioned within the pocket. The pin has a perimeter. The system includes a load spreader including a first side and a second side opposite the first side. The first side is interconnected to the second side by a flexible portion. The first side, the second side and the flexible portion are received about a portion of the perimeter of the pin, and the load spreader is configured to transmit at least one of an axial point load and a circumferential point load from the pin over a surface of the shroud.

The load spreader includes a fourth side connected to the second side, and the fourth side includes a tail that extends beyond the first side. The fourth side of the load spreader is spaced apart from the first side to define a gap. The load spreader includes a fourth side connected to the second side, and the fourth side is substantially coplanar with the first side. The flexible portion includes one or more undulations. The undulations comprise a first convex portion coupled to the first side, a second convex portion coupled to the second side and a concave portion that interconnects the first convex portion and the second convex portion. The pin has a first pin end opposite a second pin end, and the second pin end comprises the portion of the perimeter of the pin. The pin includes a pin coupling flange at the second pin end, and the pin coupling flange comprises the portion of the perimeter of the pin. The pin includes a first pin coupling flange defined between the first pin end and the second pin end, and the first pin coupling flange couples the pin to the bore. The load spreader is received within the pocket. The pin is composed of a first material, the shroud is composed of a second material and the load spreader is composed of a third material, and the first material, the second material and the third material are different.

Further provided is a gas turbine engine. The gas turbine engine includes a case defining a bore, and a shroud retained within the case. The shroud defines a pocket. The gas turbine engine includes a pin received through the bore and at least partially positioned within the pocket. The gas turbine engine includes a load spreader positioned within the pocket to surround a portion of the pin. The load spreader includes a first side, a second side opposite the first side, a flexible portion that interconnects the first side to the second side and a fourth side. At least the first side, the second side and the fourth side are configured to contact the portion of the pin to transmit at least one of an axial point load and a circumferential point load from the pin over a surface of the shroud.

The pocket includes a first sidewall, a second sidewall, a third sidewall opposite the first sidewall and a fourth sidewall opposite the first sidewall. The fourth sidewall is spaced apart from the first sidewall to define an opening, and the load spreader is positioned within the pocket such that the first side is adjacent to the first sidewall and the second side of the load spreader is adjacent to the third sidewall. The fourth side of the load spreader is substantially co-planar with the first side of the load spreader. The fourth side of the load spreader extends a distance beyond the first side of the load spreader. The fourth side of the load spreader is spaced apart from the first side to define a gap. The case includes a plurality of the bores defined about a perimeter of the case, and the shroud includes a plurality of the pockets defined about a perimeter of the shroud. The gas turbine engine includes a plurality of the pins and a plurality of the load spreaders, with each pin of the plurality of pins associated with a respective one of the plurality of the bores, and each load spreader of the plurality of load spreaders is associated with an alternate one of the plurality of pins about the perimeter of the shroud.

The flexible portion comprises a first convex portion coupled to the first side, a second convex portion coupled to the second side and a concave portion that interconnects the first convex portion and the second convex portion. The pin has a first pin end opposite a second pin end, the second pin end includes a pin coupling flange, and the pin coupling flange is configured to contact at least the first side, the second side and the fourth side of the load spreader.

Also provided is a gas turbine engine. The gas turbine engine includes a case defining a bore, and a shroud retained within the case. The shroud defines a pocket that includes a first sidewall, a second sidewall, a third sidewall opposite the first sidewall and a fourth sidewall opposite the first sidewall. The fourth sidewall is spaced apart from the first sidewall to define an opening. The gas turbine engine includes a pin received through the bore and at least partially positioned within the pocket. The gas turbine engine includes a load spreader positioned within the pocket to surround a portion of the pin. The load spreader includes a first side, a second side opposite the first side, a flexible portion that interconnects the first side to the second side and a fourth side. At least the first side, the second side and the fourth side are configured to contact the portion of the pin to transmit at least one of an axial point load and a circumferential point load from the pin over a surface of the shroud. The fourth side defines a tail that extends through the opening.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
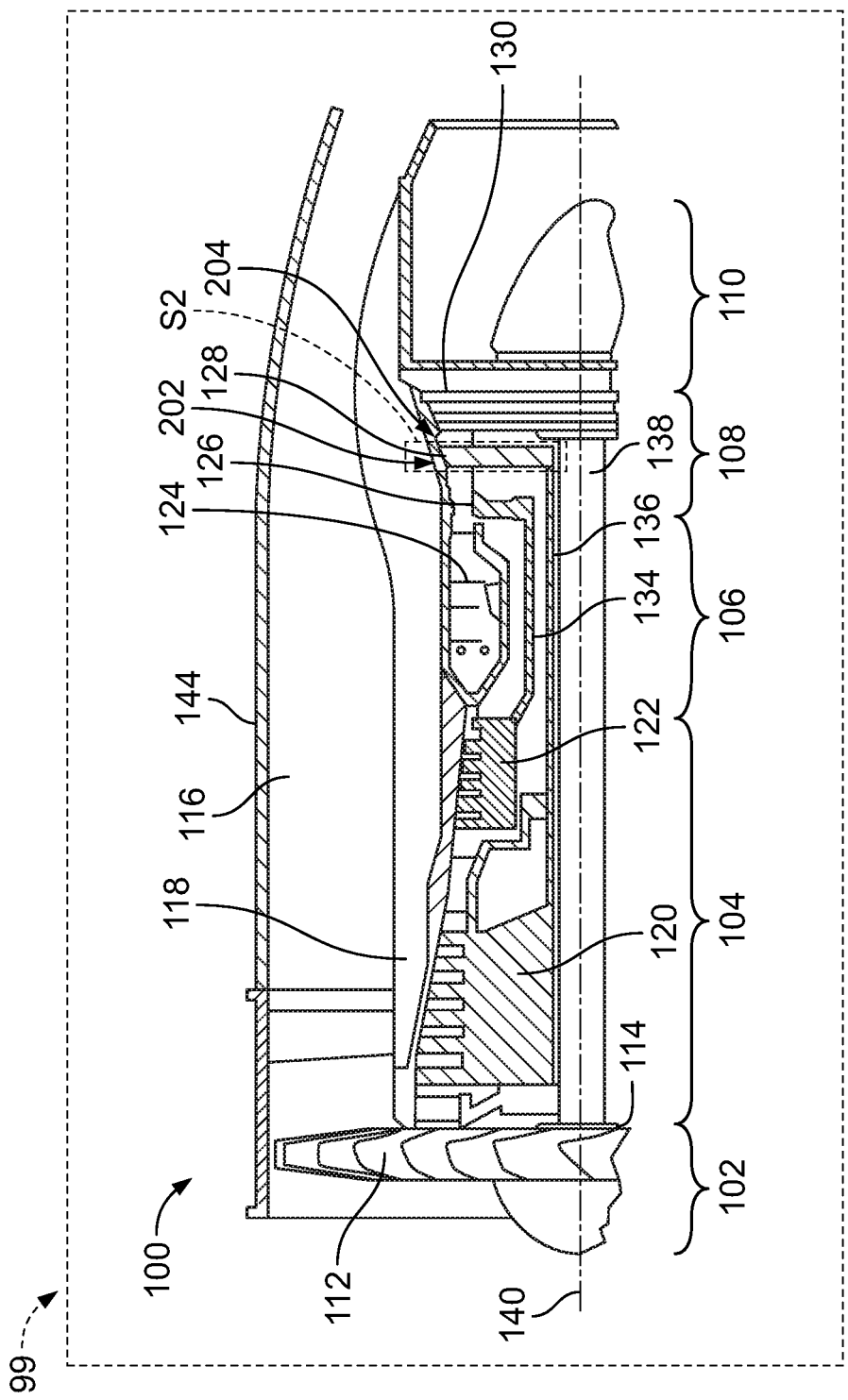
FIG. 1 is a schematic cross-sectional illustration of a gas turbine engine, which includes an exemplary compliant retention system in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of arrangement that would benefit from a compliant retention system and the use of the compliant retention system for coupling a shroud to a case associated with a gas turbine engine described herein is merely one exemplary embodiment according to the present disclosure. In addition, while the compliant retention system is described herein as being used with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "transverse" denotes an axis that crosses another axis at an angle such that the axis and the other axis are neither substantially perpendicular nor substantially parallel.

With reference to FIG. 1, a partial, cross-sectional view of an exemplary gas turbine engine 100 is shown with the remaining portion of the gas turbine engine 100 being axisymmetric about a longitudinal axis 140, which also comprises an axis of rotation for the gas turbine engine 100. In the depicted embodiment, the gas turbine engine 100 is an annular multi-spool turbofan gas turbine jet engine within an aircraft 99, although other arrangements and uses may be provided. As will be discussed herein, with brief reference to FIG. 2, the gas turbine engine 100 includes a compliant retention system 200 for coupling a shroud 202 to a casing or engine case 204. In one example, the compliant retention system 200, the shroud 202 and the engine case 204 are associated with a stage S2 of a turbine section 108 of the gas turbine engine 100, however, the compliant retention system 200, the shroud 202 and the engine case 204 may be associated with a stage of a compressor section 104 of the gas turbine engine 100. As will be discussed, the compliant retention system 200 maintains the axial and circumferential alignment of the shroud 202 or concentricity of the shroud 202 relative to the engine case 204 even with differences in thermal growth between the shroud 202 and the engine case 204, which maintains tip clearances. In addition, the compliant retention system 200 also eliminates axial and circumferential point loading of the shroud 202 when coupled to the engine case 204 via one or more load spreaders 302 (FIG. 8), as will be discussed further herein.

In this example, with reference back to FIG. 1, the gas turbine engine 100 includes a fan section 102, the compressor section 104, a combustor section 106, the turbine section 108, and an exhaust section 110. The fan section 102 includes a fan 112 mounted on a rotor 114 that draws air into the gas turbine engine 100 and accelerates it. A fraction of the accelerated air exhausted from the fan 112 is directed through an outer (or first) bypass duct 116 and the remaining fraction of air exhausted from the fan 112 is directed into the compressor section 104. The outer bypass duct 116 is generally defined between the inner bypass duct 118 and an outer casing 144. In the embodiment of FIG. 1, the compressor section 104 includes an intermediate pressure compressor 120 and a high pressure compressor 122. However, in other embodiments, the number of compressors in the compressor section 104 may vary. In the depicted embodiment, the intermediate pressure compressor 120 and the high pressure compressor 122 sequentially raise the pressure of the air and direct a majority of the high pressure air into the combustor section 106. A fraction of the compressed air bypasses the combustor section 106 and is used to cool, among other components, turbine blades in the turbine section 108.

In the embodiment of FIG. 1, in the combustor section 106, which includes a combustion chamber 124, the high pressure air is mixed with fuel, which is combusted. The high-temperature combustion air is directed into the turbine section 108. In this example, the turbine section 108 includes three turbines disposed in axial flow series, namely, a high pressure turbine 126, an intermediate pressure turbine 128, and a low pressure turbine 130. However, it will be appreciated that the number of turbines, and/or the configurations thereof, may vary. In this embodiment, the high-temperature air from the combustor section 106 expands through and rotates each turbine 126, 128, and 130. As the turbines 126, 128, and 130 rotate, each drives equipment in the gas turbine engine 100 via concentrically disposed shafts or spools. In one example, the high pressure turbine 126 drives the high pressure compressor 122 via a high pressure shaft 134, the intermediate pressure turbine 128 drives the intermediate pressure compressor 120 via an intermediate pressure shaft 136, and the low pressure turbine 130 drives the fan 112 via a low pressure shaft 138. In this example, the shroud 202 is circumferentially disposed about the intermediate pressure turbine 128, and the engine case 204 is coupled to a portion of a casing associated with the combustor section 106. The compliant retention system 200 couples the shroud 202 to the engine case 204. The casing associated with the combustor section 106, in turn, may be coupled to the inner bypass duct 118. It should be noted that the placement of the shroud 202 and the engine case 204 about the intermediate pressure turbine 128 is merely exemplary, as the shroud 202, the engine case 204 and the compliant retention system 200 may be employed with any turbine in the turbine section 108 or compressor in the compressor section 104.

Figure 2:
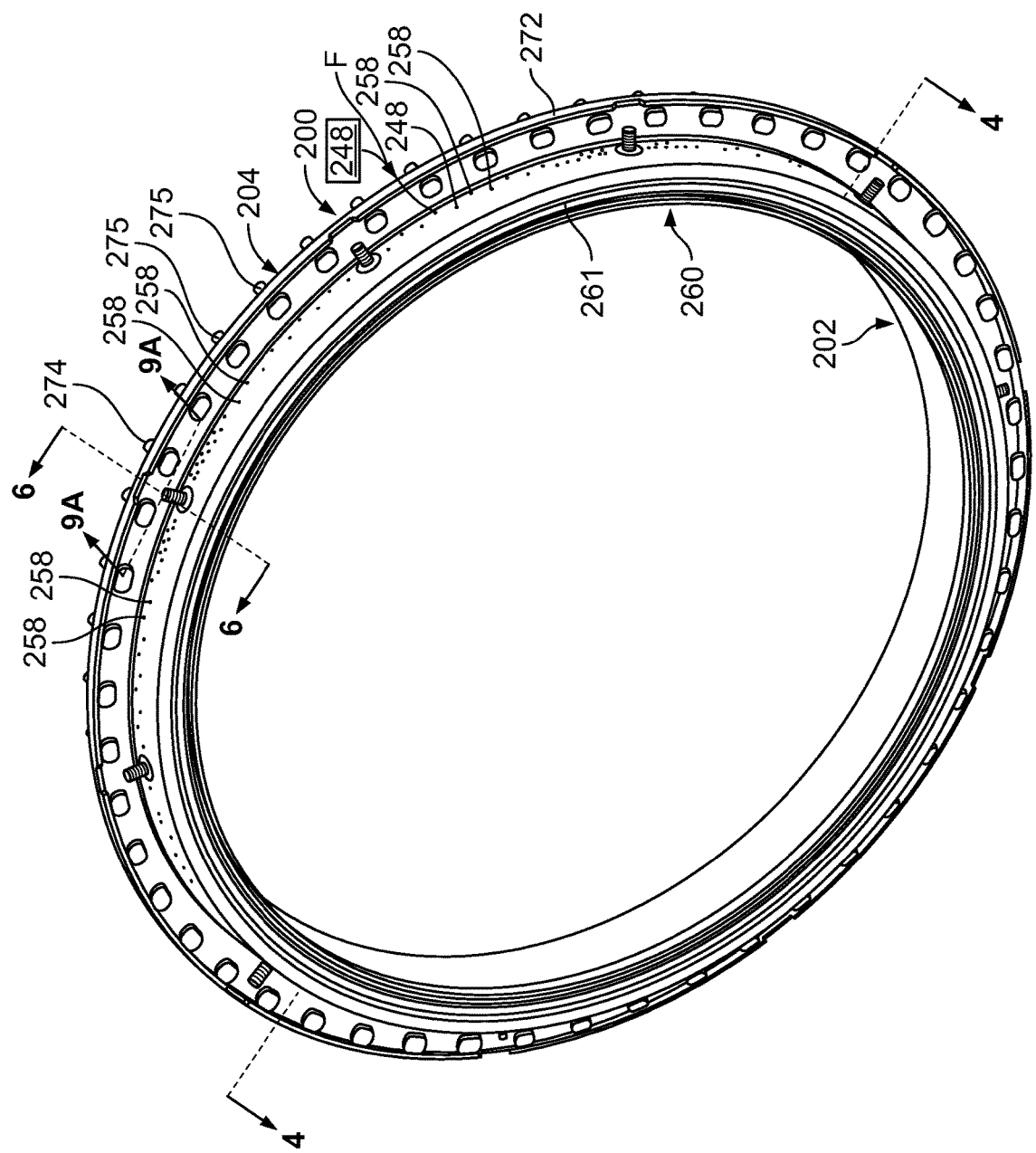
FIG. 2 is a perspective view of the compliant retention system coupling a shroud to an engine case in accordance with various embodiments.
Figure 3:
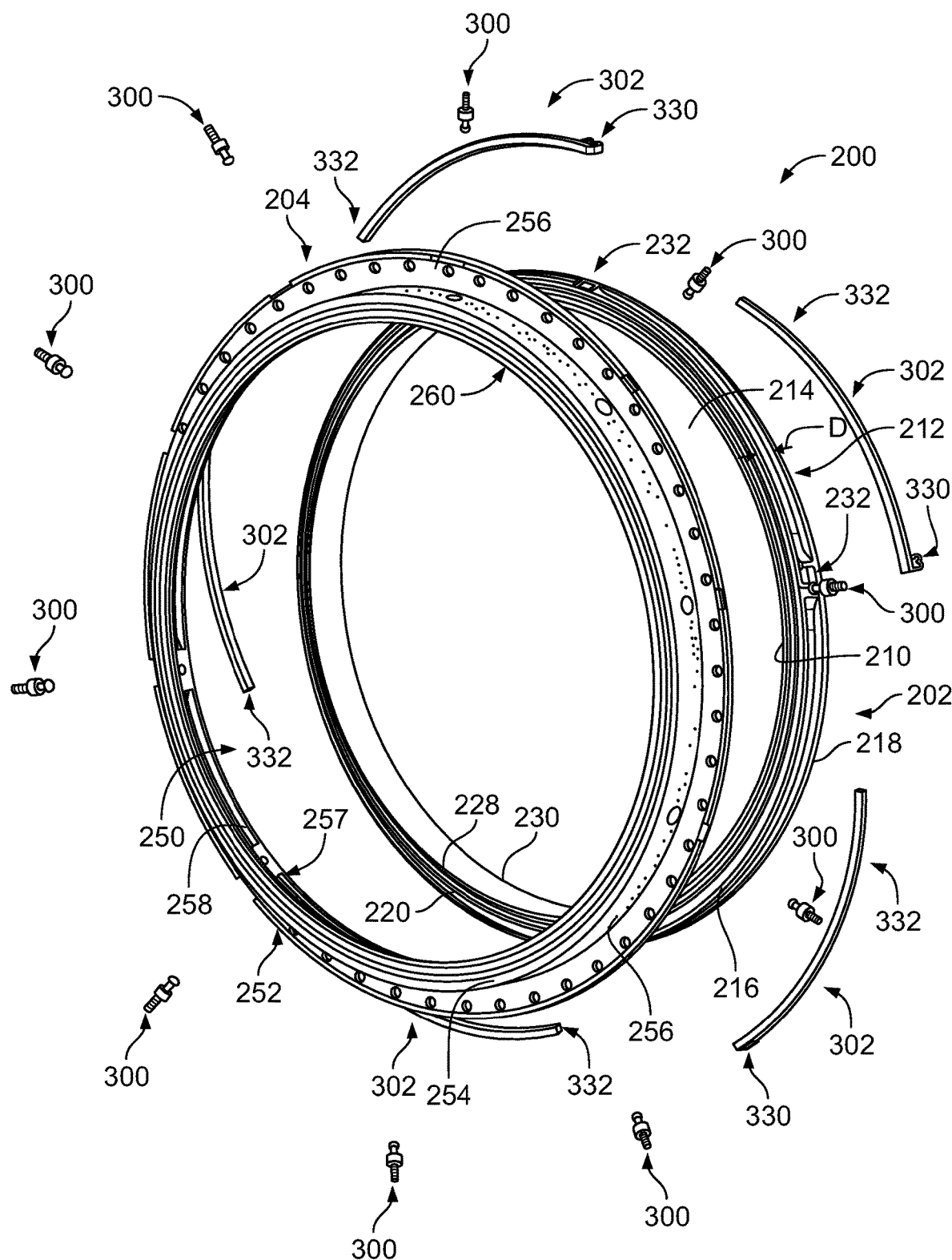
FIG. 3 is an exploded view of the compliant retention system, the shroud and the engine case.

With reference to FIG. 2, a perspective view of the compliant retention system 200 for coupling the shroud 202 to the engine case 204 is shown. In FIG. 2, the stage of the intermediate pressure turbine 128 is not shown for clarity. In one example, the shroud 202 is annular and surrounds the stage S2 of the turbine section 108, which in this example is the intermediate pressure turbine 128 (FIG. 1). The shroud 202 is composed of any suitable material, such as a metal, metal alloy, composite, polymer based material, ceramic based material, etc. The shroud 202 may be formed by casting, molding, additive manufacturing, machining, etc. In one example, the shroud 202 is composed of a ceramic based material, which may have a thermal growth rate that is different than a thermal growth rate associated with the engine case 204. For example, the shroud 202 is composed of a ceramic matrix composite. With reference to FIG. 3, the shroud 202 includes a first surface 210 opposite a second surface 212. The first surface 210 defines an inner diameter of the shroud 202, while the second surface 212 defines an outer diameter of the shroud 202. The first surface 210 surrounds a central bore 214 of the shroud 202, which is sized to enable the shroud 202 to be positioned about the stage S2 of the turbine section 108 or the intermediate pressure turbine 128 (FIG. 1) at a predefined distance from tips of the rotor blades associated with the intermediate pressure turbine 128. The first surface 210 is generally smooth. The second surface 212 includes a first flange 216, a second flange 218, a retaining lip 220 and at least one or a plurality of load spreader pockets 232.

Figure 6:
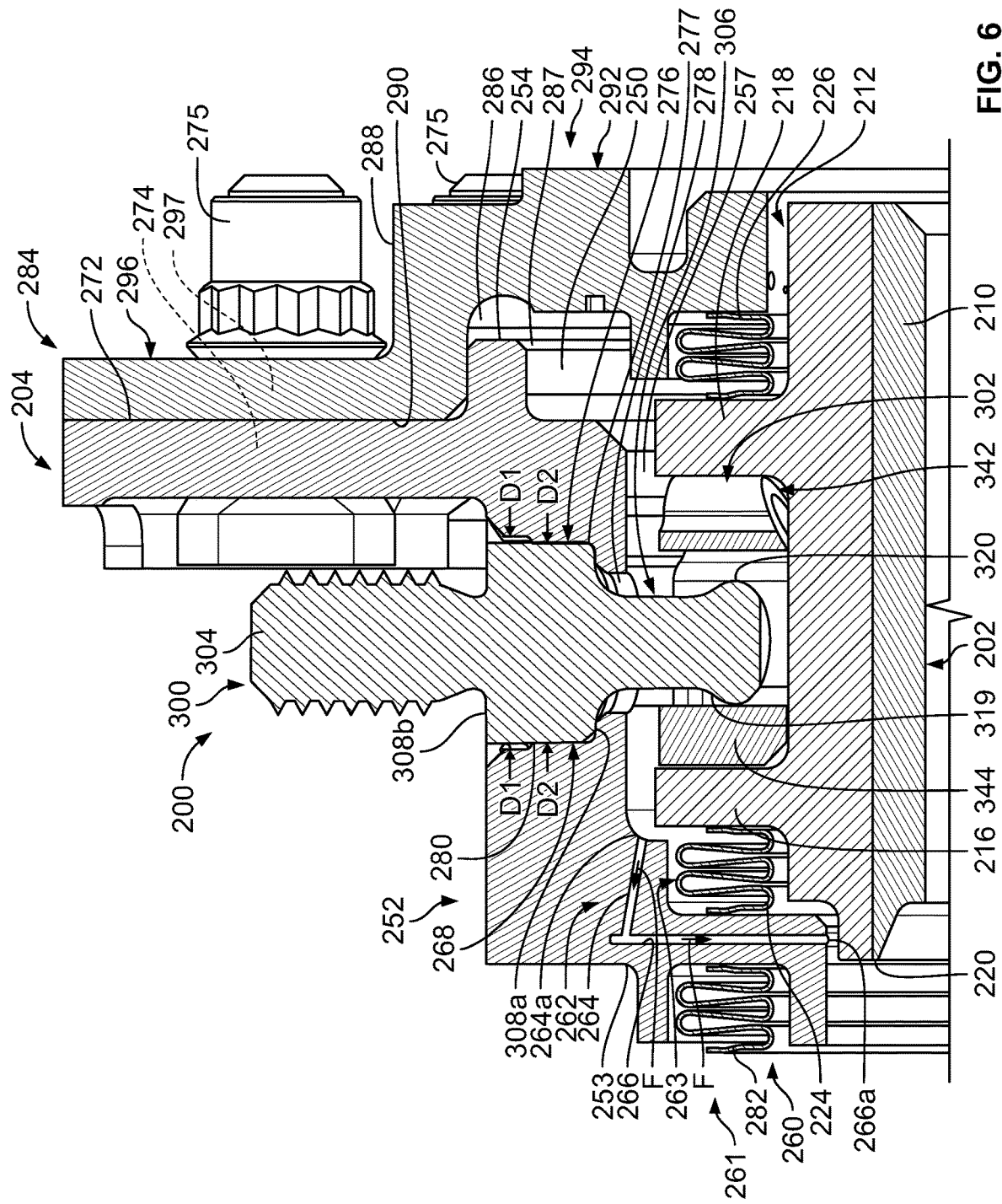
FIG. 6 is a cross-sectional view of the compliant retention system, the shroud and the engine case, taken along line 6-6 of FIG. 2.

The first flange 216 extends about an entirety of a perimeter or circumference of the second surface 212. The first flange 216 cooperates with a first seal 224 (FIG. 6) disposed or coupled between the first flange 216 and a portion of the engine case 204. The second flange 218 extends about an entirety of a perimeter or circumference of the second surface 212. The second flange 218 cooperates with a second seal 226 (FIG. 6) disposed or coupled between the second flange 218 and a portion of the gas turbine engine 100. The retaining lip 220 is defined at a first end 228 of the shroud 202, and the first end 228 is opposite a second end 230 of the shroud 202. The retaining lip 220 extends outwardly from the first end 228 to receive a portion of the engine case 204 (FIG. 6). Generally, the first flange 216 is defined proximate the first end 228 so as to be spaced a distance apart from the retaining lip 220. The second flange 218 is defined a distance D from the first flange 216 and is defined proximate the second end 230. The at least one or the plurality of load spreader pockets 232 are defined between the first flange 216 and the second flange 218, and thus, are defined between the first end 228 and the second end 230 of the shroud 202 along the outer diameter or second surface 212 of the shroud 202. The first end 228 is a leading edge of the shroud 202, while the second end 230 is downstream and forms a trailing edge for the shroud 202 in a direction of working fluid flow through the gas turbine engine 100.

Figure 4:
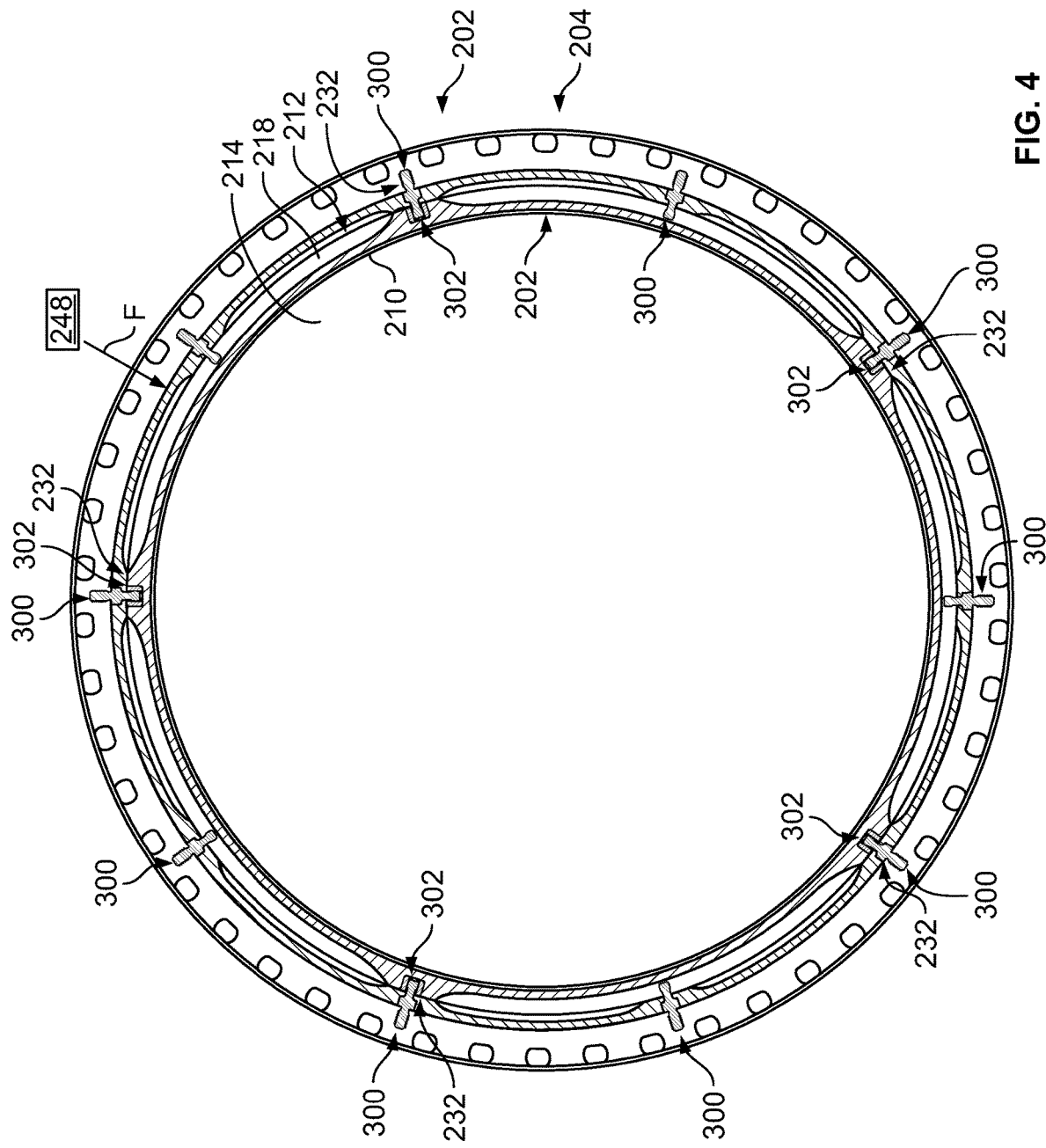
FIG. 4 is a cross-sectional view of the compliant retention system, the shroud and the engine case, taken along line 4-4 of FIG. 2.
Figure 5:
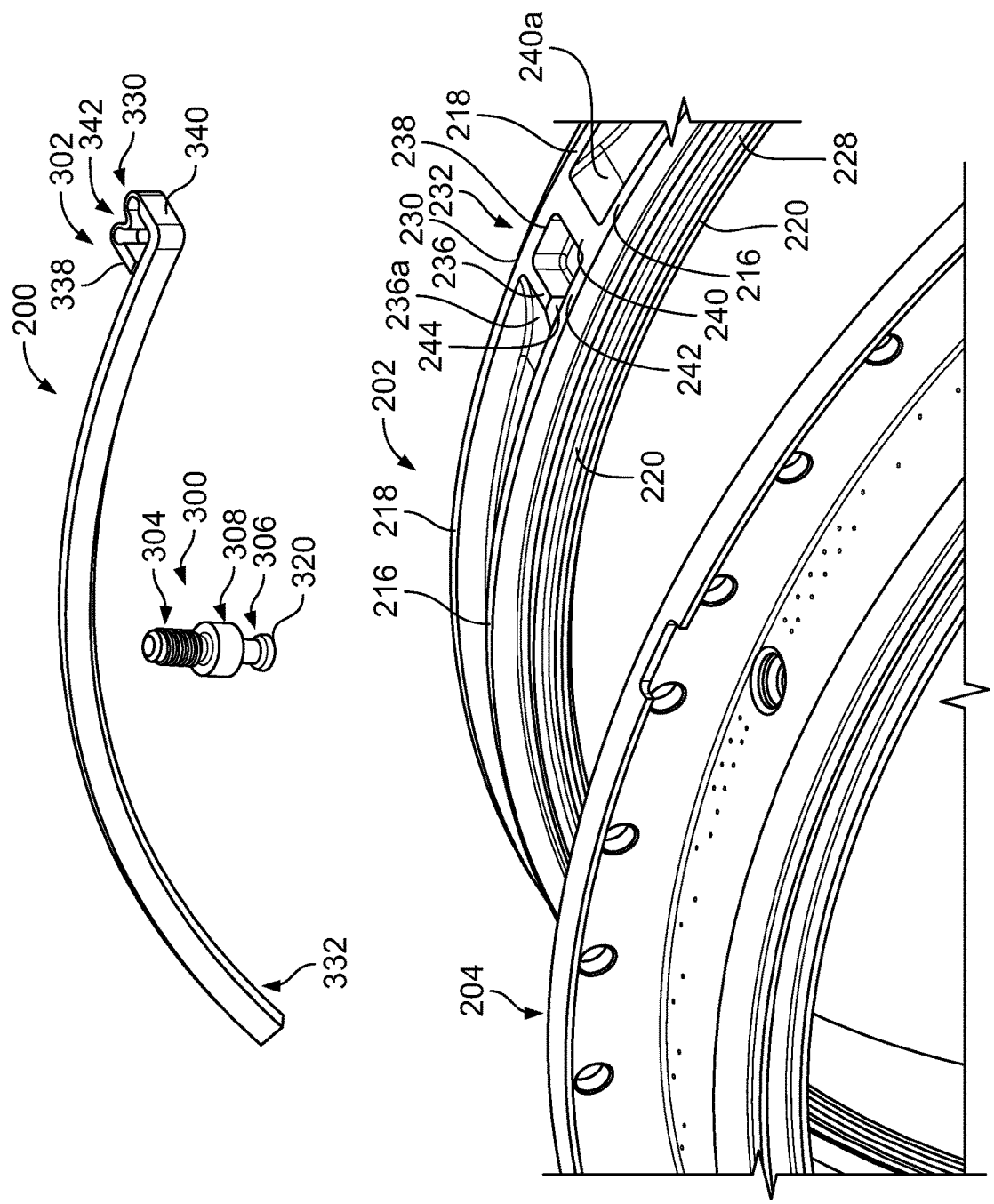
FIG. 5 is a detail exploded view of the compliant retention system, the shroud and the engine case, which illustrates a load spreader pocket associated with the shroud.

In this example, the shroud 202 includes a plurality of load spreader pockets 232. With reference to FIG. 4, in this example, the shroud 202 defines five load spreader pockets 232, which are spaced apart about a circumference of the shroud 202. It should be noted that in other examples, the shroud 202 may be configured with a different number of load spreader pockets 232 in a different arrangement. With reference to FIG. 5, one of the load spreader pockets 232 is shown. In this example, each of the load spreader pockets 232 includes a first sidewall 236, a second sidewall 238, a third sidewall 240 and a fourth sidewall 242. In this example, the first sidewall 236 is opposite the third sidewall 240, and the second sidewall 238 is opposite the fourth sidewall 242. The first sidewall 236 is spaced apart from the fourth sidewall 242 to define an opening 244 for receipt of a portion of the compliant retention system 200, as will be discussed. The first sidewall 236 extends axially from the second flange 218, and may include a ramp surface 236a for ease of manufacturing. The second sidewall 238 is defined by a portion of the second flange 218. The third sidewall 240 extends axially between the first flange 216 and the second flange 218. The third sidewall 240 may also include another ramp surface 240a for ease of manufacturing. The fourth sidewall 242 is defined by a portion of the first flange 216. Thus, the first sidewall 236, the second sidewall 238, the third sidewall 240 and the fourth sidewall 242 cooperate to define a substantially rectangular pocket, which receives a portion of a respective one of a plurality of anti-rotation pins 300. Generally, the anti-rotation pins 300 received within and coupled to the load spreader pockets 232 provide concentricity; axial retention; axial compliance; circumferential retention; and radial compliance. Cooling fluid may be received from the engine case 204 and flow between the engine case 204 and the shroud 202 to provide impingement cooling to the engine case 204 and the shroud 202.

The engine case 204 surrounds the shroud 202 and is fluidly coupled to a source 248 of cooling fluid F. The source 248 of cooling fluid F may comprise any suitable source of cooling fluid F associated with the gas turbine engine 100 including, but not limited to, compressed air received from the compressor section 104. The engine case 204 is composed of any suitable material, such as a metal, metal alloy, composite, etc. In one example, the engine case 204 is composed of a metal alloy, which has a thermal growth rate that is different than the thermal growth rate associated with the shroud 202. For example, the engine case 204 is composed of a nickel alloy, including, but not limited to Nickel Wasapaloy or Nickel Alloy 718. The engine case 204 may be formed by casting, molding, additive manufacturing, machining, etc. With reference to FIG. 3, the engine case 204 includes a first surface 250 opposite a second surface 252 and a first end 253 opposite a second end 254. The first end 253 is a leading edge of the engine case 204, while the second end 254 is downstream and forms a trailing edge for the engine case 204 in a direction of working fluid flow through the gas turbine engine 100. The engine case 204 also defines a plurality of case bores 256 and a plurality of fluid inlets 258 (FIG. 2). The first surface 250 defines an inner diameter of the engine case 204, while the second surface 252 defines an outer diameter of the engine case 204. The first surface 250 surrounds a central bore 257 of the engine case 204, which is sized to enable the engine case 204 to be positioned about the shroud 202. The first surface 250 includes a first case flange 260, which extends radially inward from the first surface 250 at the first end 253.

With reference to FIG. 6, the first case flange 260 defines a channel 261 along a face of the first case flange 260, which may receive a third seal 282, for example. In this example, the channel 261 is substantially U-shaped, however, the channel 261 may have other shapes. The first case flange 260 also defines a plurality of impingement cooling conduits 262 and a second channel 263. The impingement cooling conduits 262 are spaced apart about a circumference of the first case flange 260. In this example, each of the impingement cooling conduits 262 are the same, and includes a first branch 264 fluidly coupled to a second branch 266. The first branch 264 defines an inlet 264a for the impingement cooling conduit 262, and the second branch 266 defines an outlet 266a for the impingement cooling conduit 262. The inlet 264a is fluidly coupled to a plenum 267 defined between the engine case 204 and the shroud 202. The first branch 264 directs the cooling fluid F the plenum 267 from between the engine case 204 and the shroud 202 through the first case flange 206 and onto the shroud 202 proximate the retaining lip 220. Thus, each of the impingement cooling conduits 262 cooperate to cool both the engine case 204 and the shroud 202 at a leading edge of the engine case 204 and the shroud 202. The second channel 263 cooperates with the second surface 212 of the shroud 202 to enclose the first seal 224.

The second surface 252 defines a second case flange 272. The second case flange 272 is defined to extend radially outward from the second surface 252 at the second end 254. The second case flange 272 includes a plurality of mounting bores 274, which each receive a respective mechanical fastener 275, such as a bolt, screw, etc. to couple the engine case 204 to a portion of the casing associated with the combustor section 106 (FIG. 1). The plurality of mounting bores 274 are defined through the second case flange 272 about a perimeter or circumference of the second case flange 272, as best shown in FIG. 2.

With reference to FIG. 6, the case bores 256 receive a portion of the compliant retention system 200 to couple the engine case 204 to the shroud 202. The case bores 256 are spaced apart about a perimeter or circumference of the engine case 204, and in this example, the engine case 204 includes ten case bores 256. A respective case bore 256 is associated with a respective one of the load spreader pockets 232. Each case bore 256 includes a counterbore 276 and countersink 278. The counterbore 276 is defined through the second surface 252 toward the first surface 250. The counterbore 276 is coaxially aligned with the countersink 278, and is shaped to correspond with a portion of the compliant retention system 200. In one example, the counterbore 276 has a first diameter D1 and a second diameter D2. The first diameter D1 is different, and greater than the second diameter D2. The first diameter D1 is defined from the second surface 252 to a transition 280. The transition 280 is defined at about one-third of a length of the counterbore 276. At the transition 280, the counterbore 268 has the reduced second diameter D2 to provide an interference or press-fit with a portion of the compliant retention system 200. The second diameter D2 of the counterbore 276 terminates at an inner surface 277. The inner surface 277 provides a stop for the further advancement of the portion of the compliant retention system 200. The second diameter D2 is different and greater than a diameter of the countersink 278. The counterbore 276 may also define a chamfered surface 276a about the counterbore 276 at the second surface 252 to provide ease of assembly. The countersink 278 extends from the first surface 250 to the inner surface 277. The countersink 278 also receives a portion of the compliant retention system 200. It should be noted that the first diameter D1 and the second diameter D2 defined in the counterbore 276 is merely an example, and generally, the diameter D1 may be employed to provide for alignment of the anti-rotation pin 300 prior to press-fitting the anti-rotation pin 300 into the diameter D2. In other embodiments, the counterbore 276 may have a constant diameter D2, which extends along the entirety of the counterbore 276, such that the anti-rotation pin 300 is press-fit with the engine case 204 over the depth of the counterbore 276.

With reference to FIG. 2, the fluid inlets 258 (FIG. 2) are each fluidly coupled to the source 248 of the cooling fluid F. It should be noted that while the source 248 is shown schematically as a rectangle, the source 248 may be defined about a perimeter of the engine case 204 and fluidly coupled to the fluid inlets 258. The source 248 is in fluid communication with each of the fluid inlets 258 via one or more ducts, conduits, etc. The fluid inlets 258 are defined in clusters of the fluid inlets 258 about a perimeter of the engine case 204. Generally, a first predetermined number of the fluid inlets 258 are defined proximate or near the case bores 256 adjacent to the second case flange 272, while a second predetermined number of the fluid inlets 258 are defined between adjacent ones of the first predetermined number of fluid inlets 258. The first predetermined number is different and greater than the second predetermined number of fluid inlets 258 to provide different or greater cooling of the engine case 204 and the shroud 202 proximate the compliant retention system 200. Each of the fluid inlets 258 is in fluid communication with the plenum 267 (FIG. 6) to direct the cooling fluid F from the source 248 to the impingement cooling conduits 262.

With reference back to FIG. 6, the first seal 224 and the second seal 226 are coupled at the first end 228 and the second end 230, respectively, of the shroud 202. The first seal 224 and the second seal 226 are each coupled about a perimeter of the shroud 202. The third seal 282 is coupled to the channel 261 defined in the first case flange 260 of the engine case 204. In one example, the first seal 224, the second seal 226 and the third seal 282 comprise elastomeric ring seals, which have an E cross-section. The first seal 224 is coupled between the second channel 263 of the first case flange 260 and the first flange 216. The second seal 226 is coupled between the second flange 218 and an aft case 284 of the gas turbine engine 100. The third seal 282 is coupled between the channel 261 and a structure (not shown) of the gas turbine engine 100.

The aft case 284 is coupled to the engine case 204. The aft case 284 is downstream of the engine case 204 in the direction of working fluid flow through the gas turbine engine 100 (FIG. 1). The aft case 284 surrounds a portion of the shroud 202 and is fluidly coupled to the source 248 of cooling fluid F. Although not shown in FIG. 6, generally, the aft case 284 includes one or more impingement cooling conduits, similar to the engine case 204, for suppling the cooling fluid F to the aft case 284 and the shroud 202. The aft case 284 is composed of any suitable material, such as a metal, metal alloy, composite, etc. In one example, the aft case 284 is composed of a metal alloy, which has a thermal growth rate that is different than the thermal growth rate associated with the shroud 202. For example, the aft case 284 is composed of a nickel alloy, including, but not limited to Nickel Wasapaloy or Nickel Alloy 718. The aft case 284 may be formed by casting, molding, additive manufacturing, machining, etc. With reference to FIG. 3, the aft case 284 includes a first surface 286 opposite a second surface 288 and a first end 290 opposite a second end 292. The first end 290 is a leading edge of the aft case 284, while the second end 292 is downstream and forms a trailing edge for the aft case 284 in a direction of working fluid flow through the gas turbine engine 100. The first surface 286 defines an inner diameter of the aft case 284, while the second surface 288 defines an outer diameter of the aft case 284. The first surface 286 surrounds a central bore 287 of the aft case 284, which is sized to enable the engine case 204 to be positioned about a portion of the shroud 202.

The first surface 286 includes a first aft flange 294, which extends radially inward from the first surface 286 at the second end 292. The first aft flange 294 extends from the first surface 286 and cooperates with the engine case 204 to surround the shroud 202. The first aft flange 294 includes a seating surface 295, which cooperates with the second flange 218 of the shroud 202 to retain the second seal 226. The second surface 288 includes a second aft flange 296, which extends radially outward from the second surface 288 at the first end 290. The second aft flange 296 extends from the second surface 288 and defines a plurality of bores 297. Each of the bores 297 is coaxially aligned with a respective mounting bore 274 of the engine case 204 to receive a respective mechanical fastener 275 to couple the aft case 284 to the engine case 204.

The compliant retention system 200 includes the plurality of anti-rotation pins 300 and at least one load spreader 302. In one example, with reference to FIG. 3, the compliant retention system 200 includes ten anti-rotation pins 300 and five load spreaders 302. It should be noted that in other examples, the compliant retention system 200 may be configured with a different number of anti-rotation pins 300 and load spreaders 302. The anti-rotation pins 300 and the load spreaders 302 are spaced apart about a perimeter of the engine case 204 and the shroud 202. Generally, one of the load spreaders 302 is associated with a respective one of the load spreader pockets 232 of the shroud 202, and one of the anti-rotation pins 300 is associated with each one of the case bores 256. Thus, in this example, every other anti-rotation pin 300 along the perimeter of the shroud 202 is received within and coupled to one of the load spreader pockets 232. As the load spreaders 302 are received within the load spreader pockets 232 defined about the perimeter of the shroud 202, generally, the load spreaders 302 are associated with an alternate one of the plurality of anti-rotation pins 300 about the perimeter of the shroud 202. Generally, the anti-rotation pins 300 that are not associated with one of the load spreader pockets 232 are adjacent to and in contact with a portion of an adjacent load spreader 302 and the second surface 212 of the shroud 202. The anti-rotation pins 300 positioned between the load spreader pockets 232 or that are not received in one of the load spreader pockets 232 provide for axial retention of the shroud 202.

The anti-rotation pins 300 may be composed of a metal or metal alloy, and may be cast, machined, molded, etc. The load spreaders 302 may be composed of a metal or metal alloy, and may be cast, machined, molded, etc. In this example, the anti-rotation pins 300 are composed of a metal or metal alloy that is different than the metal or metal alloy of the load spreaders 302. For example, the anti-rotation pins 300 are composed of INCONEL® alloy 718, and the load spreaders 302 are composed of HAYNES® alloy 188. Thus, the anti-rotation pins 300 are composed of a first material (metal or metal alloy) that is different than a second material from which the load spreaders 302 are composed, and the first material of the anti-rotation pins 300 and the second material of the load spreaders 302 is different than a third material (ceramic based material) from which the shroud 202 is composed.

Figure 7:
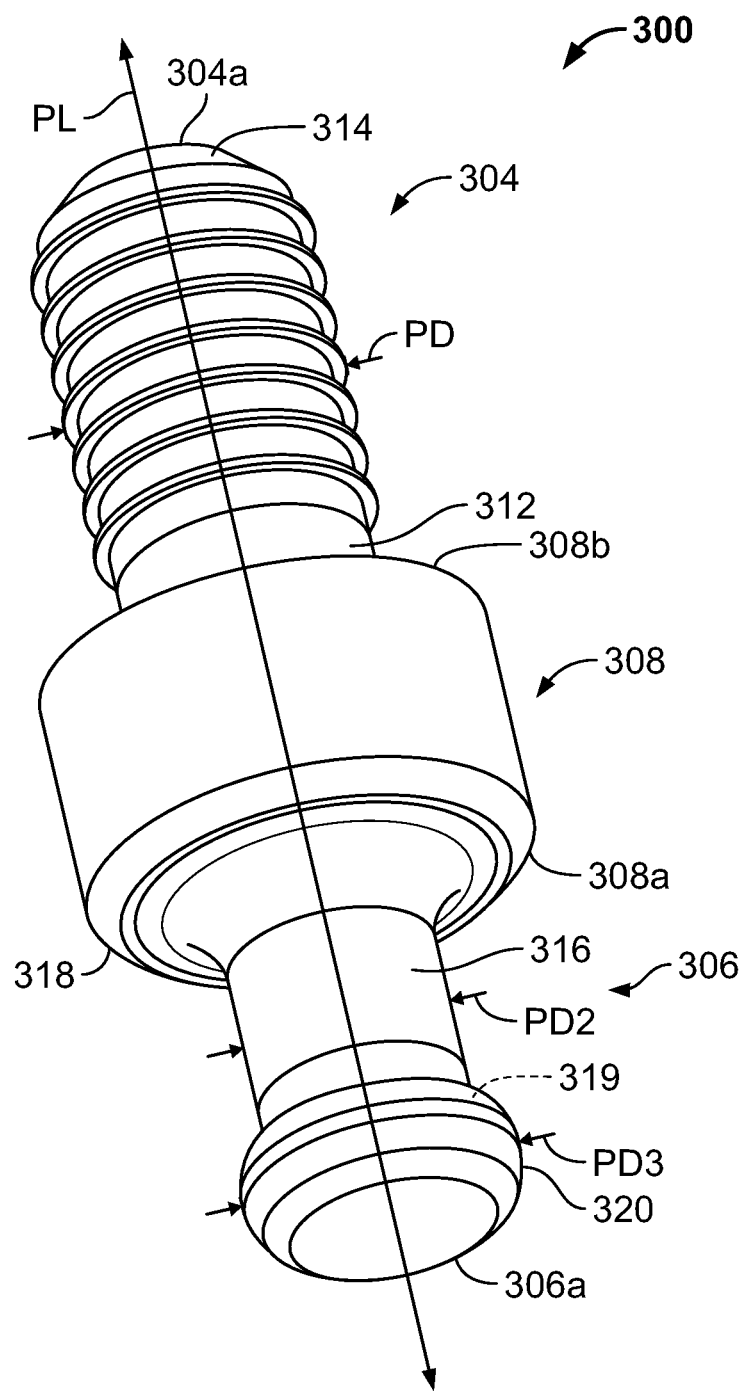
FIG. 7 is a perspective view of one anti-rotation pin associated with the compliant retention system.

With reference to FIG. 7, one of the anti-rotation pins 300 is shown in greater detail. As each of the anti-rotation pins 300 is the same, a single anti-rotation pin 300 will be discussed herein. The anti-rotation pin 300 includes a first pin end 304 opposite a second pin end 306 and a pin coupling flange 308 defined between the first pin end 304 and the second pin end 306. The anti-rotation pin 300 extends along a pin longitudinal axis PL from the first pin end 304 to the second pin end 306. The first pin end 304 is cylindrical and is sized to be received within the respective case bore 256 (FIG. 6). The first pin end 304 may include a first tapered surface 310 between the first pin end 304 and the pin coupling flange 308 to assist in the manufacturing of the anti-rotation pin 300. The first pin end 304 may also include a chamfered surface 314 at a terminal end 304a of the first pin end 304. The first pin end 304 has a first pin diameter PD, which is different and greater than a second pin diameter PD2 of an intermediate portion 316 of the second pin end 306. In one example, the first pin end 304 defines a removal feature, such as a plurality of threads defined over the first pin end 304. In other examples, the first pin end 304 includes a plurality of threads defined over a portion of the first pin end 304 or may include an internal thread. In still other examples, the first pin end 304 may include a step or hexagonal shape to mate with a removal tool. Thus, generally, the first pin end 304 enables a removal of the anti-rotation pin 300 for disassembly.

The second pin end 306 includes the intermediate portion 316 coupled to the pin coupling flange 308 via a fillet 318, for example, and a second pin coupling flange 320 defined at a terminal end 306a. The intermediate portion 316 has the second pin diameter PD2, which is sized to be received within the respective one of the load spreader pockets 232 of the shroud 202. The intermediate portion 316 is substantially smooth and cylindrical. The intermediate portion 316 transitions to the second pin coupling flange 320 via a fillet 319. The second pin coupling flange 320 is circular and has a third pin diameter PD3, which is different and greater than the second pin diameter PD2. The third pin diameter PD3 is different and less than the first pin diameter PD. By providing the third pin diameter PD3 greater than PD2, the second pin coupling flange 320 defines the interface between the anti-rotation pin 300 and the load spreader 302. The second pin coupling flange 320 is sized to be received within and coupled to a respective one of the load spreaders 302. The second pin coupling flange 320 defines a portion of a perimeter of the anti-rotation pin 300.

The pin coupling flange 308 extends outward from the anti-rotation pin 300. Generally, the pin coupling flange 308 is defined on the anti-rotation pin 300 such that the first pin end 304 has a length along the pin longitudinal axis PL that is different and greater than a length of the second pin end 306 along the pin longitudinal axis PL. Stated another way, the pin coupling flange 308 is not centered between the first pin end 304 and the second pin end 306. With reference to FIG. 6, the pin coupling flange 308 is sized and shaped to be received within the case bore 256 such that one side 308a of the pin coupling flange 308 contacts the inner surface 277, and an opposed side 308b is substantially flush or planar with the second surface 252 of the engine case 204.

Figure 8:
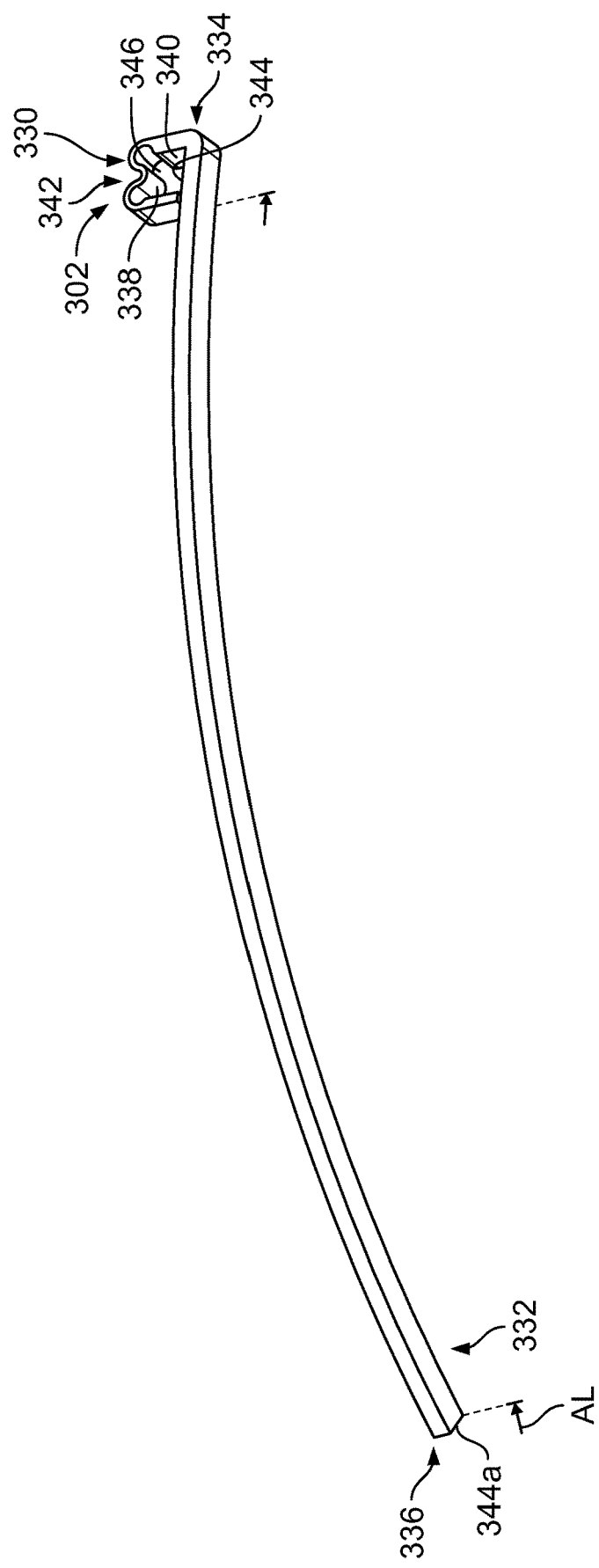
FIG. 8 is a perspective view of one load spreader associated with the compliant retention system.

With reference to FIG. 8, one of the load spreaders 302 is shown in greater detail. As each of the load spreaders 302 is the same, a single load spreader 302 will be discussed herein. In this example, the load spreader 302 includes a pin receptacle 330 and a tail 332. The pin receptacle 330 is defined at a first spreader end 334, which is opposite a second load spreader end 336. The pin receptacle 330 is configured to receive the second pin end 306 of the anti-rotation pin 300 (FIG. 7). The pin receptacle 330 includes a first receptacle side 338 opposite a second receptacle side 340. The first receptacle side 338 and the second receptacle side 340 are interconnected by a flexible portion 342, which forms a third receptacle side of the pin receptacle 330. The first receptacle side 338, the second receptacle side 340 and the flexible portion 342 cooperate with a fourth receptacle side 344 to define an opening 346 to receive the anti-rotation pin 300. With reference to FIG. 9A, the first receptacle side 338 and the second receptacle side 340 are parallel and contact the second pin coupling flange 320 when the anti-rotation pin 300 is coupled to the load spreader 302. The contact between the second pin coupling flange 320, the first receptacle side 338 and the second receptacle side 340 maintains radial compliance between the shroud 202 and the engine case 204. The contact between the second pin coupling flange 320, the first receptacle side 338 and the second receptacle side 340 also transfers a circumferential point load from the anti-rotation pin 300 to the load spreader 302, which reduces point loading applied to the shroud 202 as the load spreader 302 distributes the circumferential point load applied by the anti-rotation pin 300 over the load spreader 302, and thus, over the second surface 212 of the shroud 202. In addition, the contact between the second pin coupling flange 320, the first receptacle side 338 and the second receptacle side 340 inhibits a rotation of the shroud 202 relative to the engine case 204 or provides for an anti-rotation feature to maintain concentricity of the shroud 202 or to maintain the tip clearance.

Figure 9:
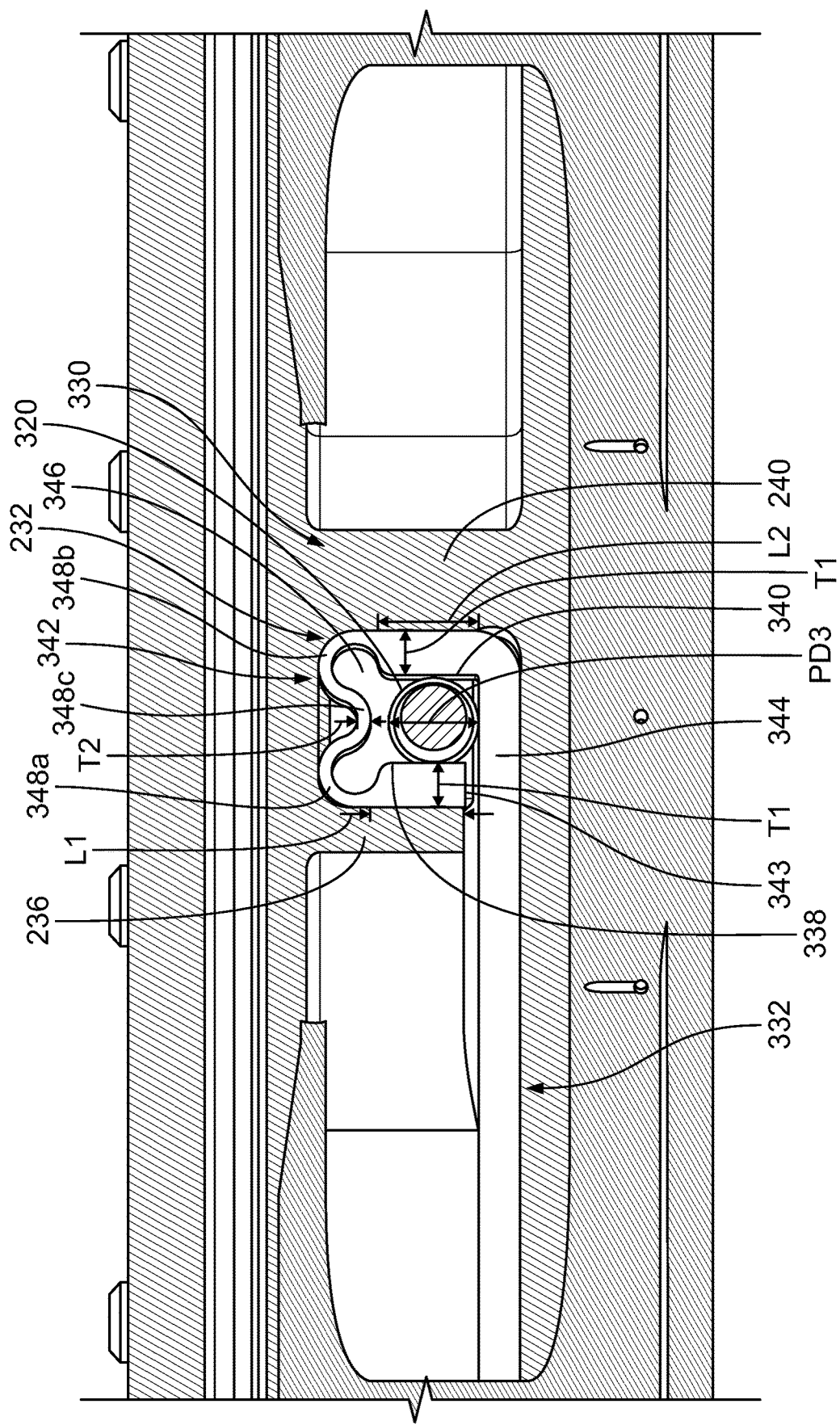
FIG. 9 is a top view of the compliant retention system coupled to the shroud, in which a portion of the engine case is removed for clarity.
Figure 9A:
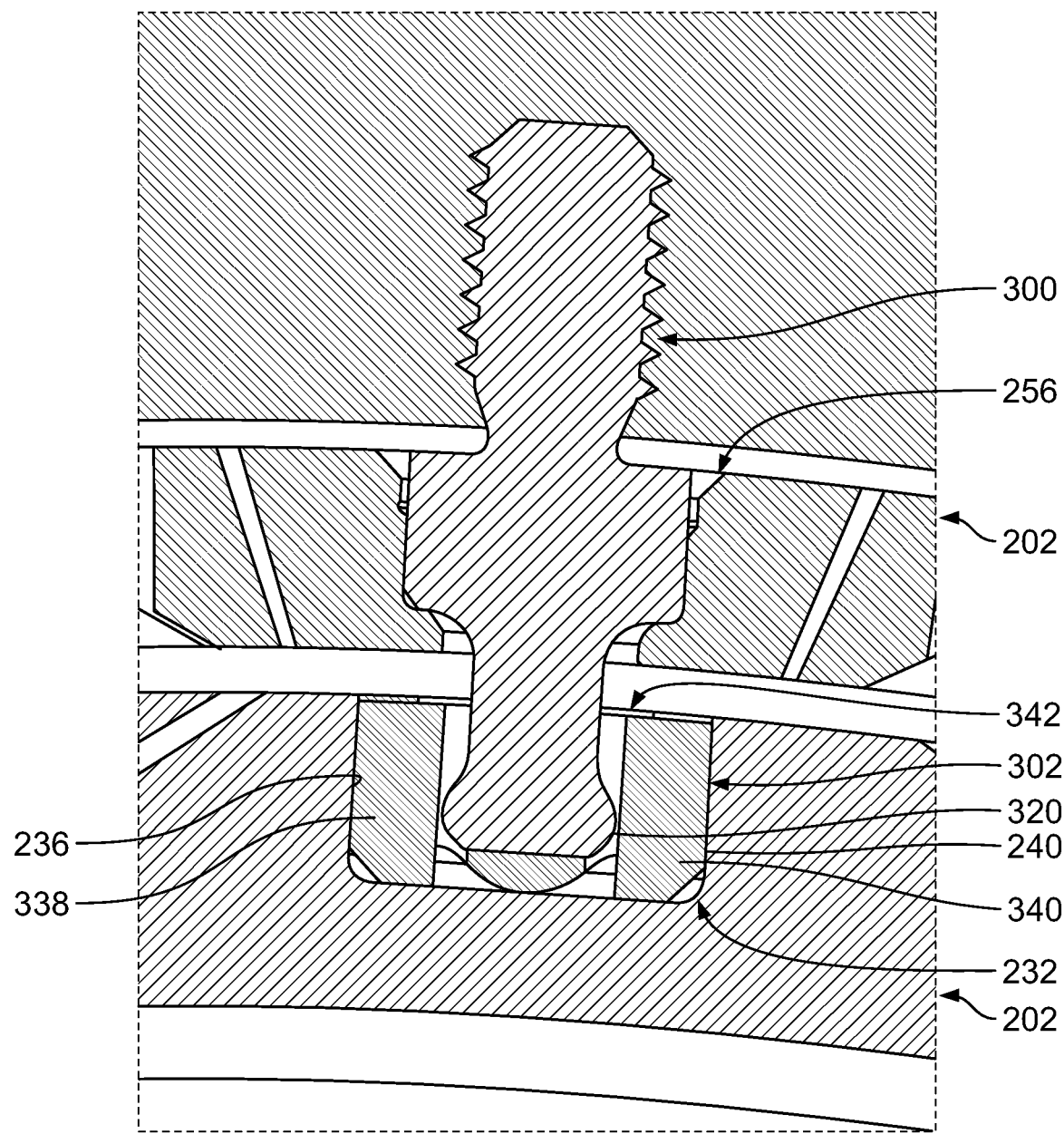
FIG. 9A is a cross-sectional view of the compliant retention system, the shroud and the engine case, taken along line 9A-9A of FIG. 2.

With reference to FIG. 9, the first receptacle side 338 extends for a length L1, which is different and less than a length L2 of the second receptacle side 340 such that a gap 343 is defined between the first receptacle side 338 and the fourth receptacle side 344. The second receptacle side 340 extends for the length L2, which is different and greater than the third pin diameter PD3. The third pin diameter PD3 may be different or the same as the length L1 of the first receptacle side 338. The lengths L1, L2 ensure that the second pin coupling flange 320 remains in contact with a portion of the first receptacle side 338 and the second receptacle side 340 during thermal growth of the shroud 202. The first receptacle side 338 and the second receptacle side 340 also have a thickness T1, which is different and greater than a thickness T2 of the flexible portion 342. The difference in the thicknesses T1, T2 ensures the flexibility of the flexible portion 342 relative to the first receptacle side 338 and the second receptacle side 340. The first receptacle side 338 contacts and abuts the first sidewall 236 of the load spreader pocket 232, and the second receptacle side 340 contacts and abuts the third sidewall 240 of the load spreader pocket 232.

The flexible portion 342 interconnects the first receptacle side 338 and the second receptacle side 340. In one example, the flexible portion 342 has a substantially undulating shape, and includes a first convex portion 348a and a second convex portion 348b connected to a concave portion 348c. Generally, the first receptacle side 338 is coupled or connected to the first convex portion 348a, which is connected to the concave portion 348c. The concave portion 348c is connected to the second convex portion 348b, and the second convex portion 348b is coupled to the second receptacle side 340. The flexible portion 342 enables the anti-rotation pin 300 to be received within the opening 346, and compensates for the thermal growth of the shroud 202 relative to the engine case 204. Generally, the flexible portion 342 may expand or contract during the thermal growth of the shroud 202, while enabling the load spreader 302 to maintain radial and axial compliance. The flexible portion 342 maintains contact between the load spreader 302 and the shroud 202 during the operation of the gas turbine engine 100 (FIG. 1). Thus, the load spreader 302 includes the first receptacle side 338, the second receptacle side 340 and the flexible portion 342, which are received about the portion of the perimeter or the second pin coupling flange 320 of the anti-rotation pin 300. In this example, the flexible portion 342 is compressed to insert and couple the load spreader 302 to the load spreader pocket 232 such that a snap-fit is formed between the respective load spreader 302 and load spreader pocket 232. The compression of the flexible portion 324 also biases the first receptacle side 338 and the second receptacle side 340 against the second pin coupling flange 320 of the anti-rotation pin 300.

The fourth receptacle side 344 is opposite the flexible portion 342. The fourth receptacle side 344 is connected to the second receptacle side 340, but is spaced a distance apart from the first receptacle side 338. The gap 343 defined between the first receptacle side 338 and the fourth receptacle side 344 enables the pin receptacle 330 to expand or contract if needed during the thermal growth of the shroud 202. The fourth receptacle side 344 is perpendicular to the first receptacle side 338 and the second receptacle side 340 such that the pin receptacle 330 is substantially rectangular. The fourth receptacle side 344 cooperates with the flexible portion 342 to maintain axial compliance of the shroud 202 during thermal growth, and reduces axial point loading on the shroud 202. In this regard, the contact between the second pin coupling flange 320 and the fourth receptacle side 344 transfers an axial point load from the anti-rotation pin 300 to the load spreader 302, which reduces point loading applied to the shroud 202 as the load spreader 302 distributes the axial point load applied by the anti-rotation pin 300 over the load spreader 302. With brief reference to FIG. 6, the second pin coupling flange 320 of the anti-rotation pin 300 contacts the fourth receptacle side 344 to provide axial compliance.

Figure 8A:
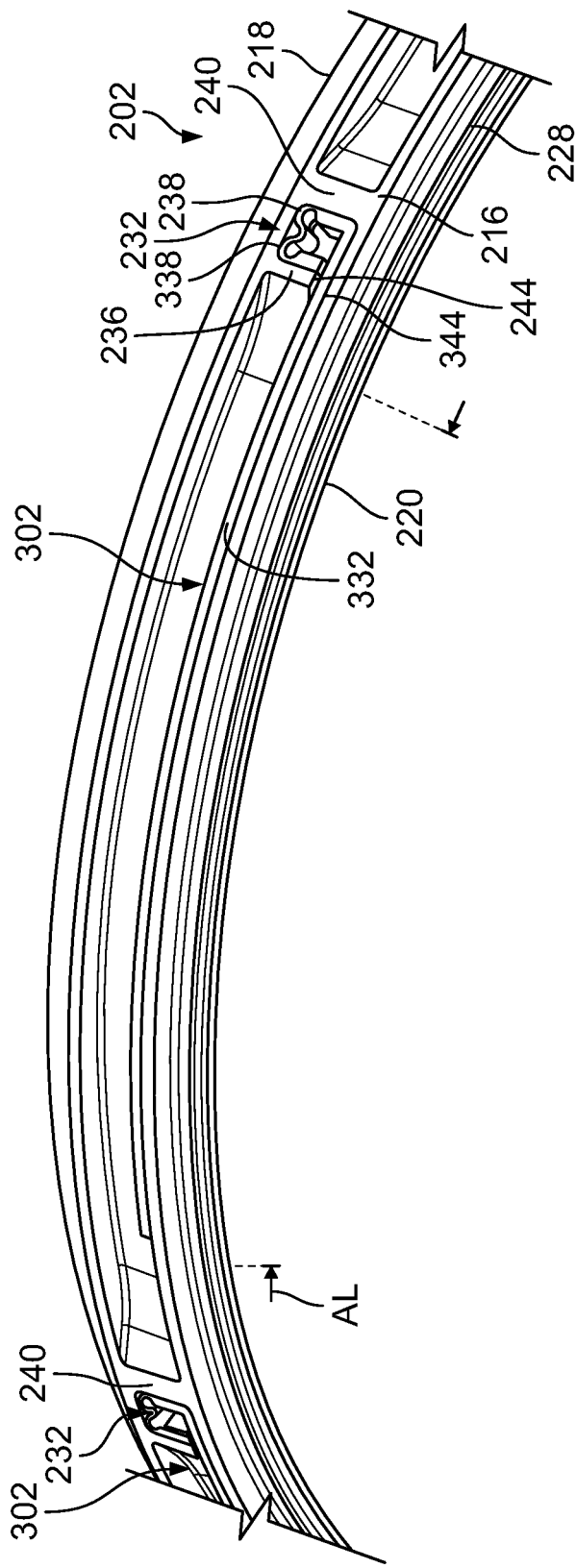
FIG. 8A is a perspective view of one load spreader coupled to the shroud, in which the engine case and anti-rotation pins are removed for clarity.

In one example, with reference back to FIG. 8, the fourth receptacle side 344 is elongated to define the tail 332. Stated another way, a terminal end 344a of the fourth receptacle side 344 is spaced a predetermined distance away from the first receptacle side 338 and is not coplanar with the first receptacle side 338. The tail 332 has a curvature, which is predefined based on a radius of curvature of the shroud 202. The tail 332 generally extends for an arc length AL. The arc length AL is predetermined such that the tail 332 extends from the fourth receptacle side 344 proximate the first receptacle side 338 through the opening 244 defined in the shroud 202 to proximate the third sidewall 240 of a directly adjacent one of the load spreader pockets 232, as shown in FIG. 8A. As shown in FIG. 3, the arc length AL of the tail 332 enables a reduced number of load spreaders 302 to be employed with the shroud 202, while still reducing point loading on the shroud 202 and providing radial and axial compliance. Thus, generally, the tail 332 extends between adjacent ones of the load spreader pockets 232 such that a respective one of the anti-rotation pins 300 is adjacent to the tail 332 along the arc length AL of the tail 332 (See also FIG. 4). Stated another way, the tail 332 of the load spreader 302 extends past and is uncoupled from the respective one of the anti-rotation pins 300 that is positioned between anti-rotation pins 300 received in adjacent load spreader pockets 232. The tail 322 provides for increased distribution of the load applied by the respective anti-rotation pins 300 circumferentially about the second surface 212 of the shroud 202.

Figure 10:
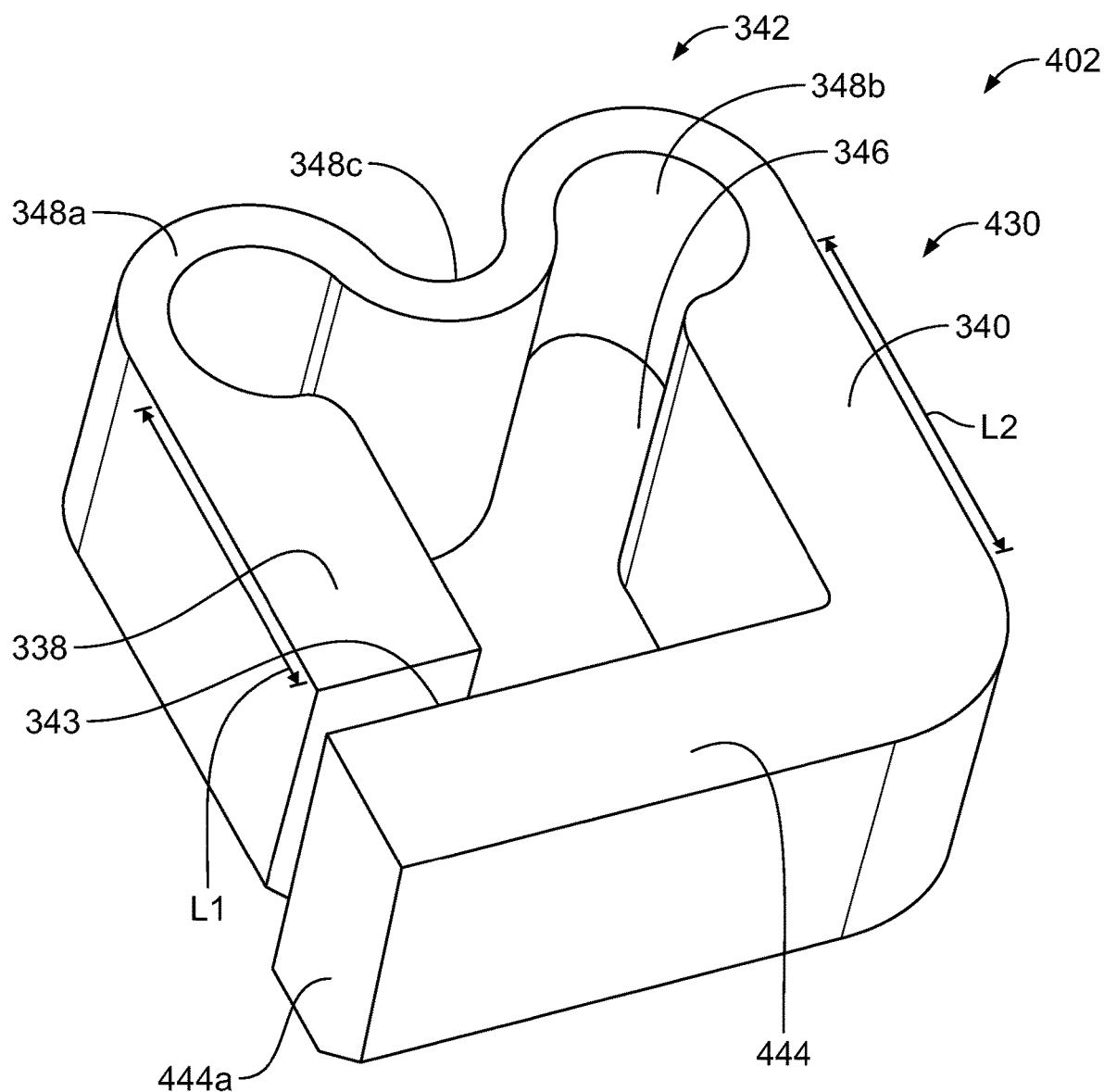
FIG. 10 is a perspective view of another exemplary load spreader for use with the compliant retention system.

It should be noted that in other embodiments, the load spreader 302 may be configured differently to distribute point loading from the anti-rotation pin 300 over the second surface 212 of the shroud 202 while providing radial and axial compliance. For example, with reference to FIG. 10, another exemplary load spreader 402 for use with the compliant retention system 200 is shown. As the load spreader 402 includes the same or substantially the same features as the load spreader 302, the same reference numerals will be used. The load spreader 402 includes a pin receptacle 430, but does not include a tail. The pin receptacle 430 is configured to receive the second pin end 306 of the anti-rotation pin 300 (FIG. 7). The pin receptacle 430 includes the first receptacle side 338 opposite the second receptacle side 340. The first receptacle side 338 and the second receptacle side 340 are interconnected by the flexible portion 342, which forms a third receptacle side of the pin receptacle 430. The first receptacle side 338, the second receptacle side 340 and the flexible portion 342 cooperate with a fourth receptacle side 444 to define the opening 346 to receive the anti-rotation pin 300. The first receptacle side 338 and the second receptacle side 340 are parallel and contact the second pin coupling flange 320 when the anti-rotation pin 300 is coupled to the load spreader 302. The first receptacle side 338 extends for the length L1, which is different and less than the length L2 of the second receptacle side 340 such that the gap 343 is defined between the first receptacle side 338 and the fourth receptacle side 444.

The contact between the second pin coupling flange 320, the first receptacle side 338 and the second receptacle side 340 maintains radial compliance between the shroud 202 and the engine case 204. The contact between the second pin coupling flange 320, the first receptacle side 338 and the second receptacle side 340 also transfers the circumferential point load from the anti-rotation pin 300 to the load spreader 402, which reduces point loading applied to the shroud 202 as the load spreader 402 distributes the load applied by the anti-rotation pin 300 over the load spreader 402, and thus, the second surface 212 of the shroud 202. The contact between the second pin coupling flange 320, the first receptacle side 338 and the second receptacle side 340 also inhibits a rotation of the shroud 202 relative to the engine case 204 or provides an anti-rotation feature to maintain concentricity or the tip clearance. The first receptacle side 338 contacts and abuts the first sidewall 236 of the load spreader pocket 232 (FIG. 9), and the second receptacle side 340 contacts and abuts the third sidewall 240 of the load spreader pocket 232 (FIG. 9).

The flexible portion 342 interconnects the first receptacle side 338 and the second receptacle side 340. The flexible portion 342 includes the first convex portion 348a and the second convex portion 348b connected to the concave portion 348c. The fourth receptacle side 444 is opposite the flexible portion 342. The fourth receptacle side 444 is connected to the second receptacle side 340, but is spaced a distance apart from the first receptacle side 338. The gap 343 defined between the first receptacle side 338 and the fourth receptacle side 444 enables the pin receptacle 430 to expand or contract if needed during the thermal growth of the shroud 202. The fourth receptacle side 444 is perpendicular to the first receptacle side 338 and the second receptacle side 340 such that the pin receptacle 430 is substantially rectangular. The fourth receptacle side 444 cooperates with the flexible portion 342 to maintain axial compliance of the shroud 202 during thermal growth. The second pin coupling flange 320 of the anti-rotation pin 300 (FIG. 6) contacts the fourth receptacle side 444 to provide axial compliance. In addition, the contact between the second pin coupling flange 320 and the fourth receptacle side 444 transfers an axial point load from the anti-rotation pin 300 to the load spreader 402, which reduces point loading applied to the shroud 202 as the load spreader 402 distributes the axial point load applied by the anti-rotation pin 300 over the load spreader 402, and thus, over the second surface 212 of the shroud 202. In this example, the fourth receptacle side 444 is coplanar with the first receptacle side 338 such that a terminal end 444a of the fourth receptacle side 444 is adjacent to or aligned with the first receptacle side 338. Thus, in this example, the load spreader 402 does not include the tail. The load spreader 402 reduces point loading by the anti-rotation pins 300 by distributing the load through the pin receptacle 430, while maintaining radial and axial compliance during thermal growth and concentricity. It should be noted that in certain embodiments, the load spreader 302, 402 may not include the flexible portion 342, but may include another feature to enable the load spreader 302, 402 to be in contact with the load spreader pocket 232 during the operation of the gas turbine engine 100.

In one example, in order to assemble the shroud 202 to the engine case 204 with the compliant retention system 200, the load spreaders 302, 402 are coupled to the load spreader pockets 232 (FIG. 9) of the shroud 202 (FIG. 9) via the snap-fit, for example. The shroud 202 is positioned adjacent to the engine case 204, and with reference to FIG. 4, the anti-rotation pins 300 are inserted into the case bores 256 and coupled to the case bores 256 via the press-fit. Alternative ones of the anti-rotation pins 300 are also coupled to and received within respective pin receptacles 330, 430 of the load spreaders 302, 402. With reference to FIG. 9A, the anti-rotation pins 300 are coupled to the load spreader pockets 232 such that the first receptacle side 338 and the second receptacle side 340 are coupled to or in contact with the second pin coupling flange 320 of the anti-rotation pin 300 to provide radial compliance during thermal growth and anti-rotation or concentricity of the shroud 202 relative to the engine case 204. With reference to FIG. 6, the anti-rotation pins 300 are coupled to the load spreader pockets 232 such that at least the fourth receptacle side 344, 444 is coupled to or in contact with the second pin coupling flange 320 of the anti-rotation pin 300 to provide axial compliance of the shroud 202 relative to the engine case 204 during thermal growth.

Generally, when the anti-rotation pins 300 are coupled to the shroud 202 and the engine case 204, the anti-rotation pins 300 retain the shroud 202 to the engine case 204, and also react to forces applied to the shroud 202 during the operation of the gas turbine engine 100 (FIG. 1). For example, the anti-rotation pins 300 react to axial loads, which result due to an upstream and downstream pressure differential associated with the shroud 202 and from loads applied by the first seal 224 and the second seal 226. The anti-rotation pins 300 also react to circumferential loads, which may be applied by contact to the shroud 202 by rotor blades associated with the intermediate pressure turbine 128 (FIG. 1). The load spreaders 302, 402 receive these axial and circumferential loads from the anti-rotation pins 300 and distribute these axial and circumferential loads along load spreader 302, 402 and thus, along the second surface 212 of the shroud 202, which improves a life of the shroud 202.

With the shroud 202 coupled to the engine case 204 via the compliant retention system 200, the engine case 204 may be coupled to the aft case 284, for example, via the mechanical fasteners 275 and the shroud 202 may be positioned about the intermediate pressure turbine 128 (FIG. 1). The source 248 of cooling fluid F may be fluidly coupled to the fluid inlets 258 to supply the cooling fluid F to the plenum 267 and the impingement cooling conduits 262. With the shroud 202, the engine case 204 and the aft case 284 installed within the gas turbine engine 100 to surround the intermediate pressure turbine 128 (FIG. 1), during operation of the gas turbine engine 100, due to the differences in the thermal growth rates of the materials that compose the shroud 202 and the engine case 204, the shroud 202 and the engine case 204 grow or expand at different rates. The compliant retention system 200 maintains the radial and axial compliance of the shroud 202 as the shroud 202 and engine case 204 thermally grow due to the coupling of the anti-rotation pins 300 to the load spreaders 302, 402. In addition, the load spreaders 302, 402 distribute the axial and the circumferential point load from the anti-rotation pins 300 over the surface of the load spreaders 302, 402, and thus, the second surface 212 of the shroud 202. By distributing the axial and the circumferential point load from the anti-rotation pins 300 over the surface of the load spreaders 302, 402, and thus, the second surface 212 of the shroud 202, a life of the shroud 202 is improved. In addition, the compliant retention system 200 maintains tip clearance or a concentricity of the shroud 202.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for coupling a shroud to a case associated with a gas turbine engine, comprising:
   the case defining a bore;
   the shroud retained within the case, the shroud defining a pocket;
   a pin received through the bore and at least partially positioned within the pocket, the pin having a perimeter; and
   a load spreader including a first side and a second side opposite the first side, with the first side interconnected to the second side by a flexible portion including undulations, the first side, the second side and the undulations of the flexible portion cooperate to define a pin receptacle to receive the pin, the first side, the second side and the undulations of the flexible portion are positioned about a portion of the perimeter of the pin, and the load spreader is configured to transmit at least one of an axial point load and a circumferential point load from the pin over a surface of the shroud.

2. The system of claim 1, wherein the load spreader includes a fourth side connected to the second side, and the fourth side includes a tail that extends beyond the first side.

3. The system of claim 2, wherein the fourth side of the load spreader is spaced apart from the first side to define a gap.

4. The system of claim 1, wherein the load spreader includes a fourth side connected to the second side, and the fourth side is substantially coplanar with the first side.

5. The system of claim 1, wherein the undulations comprise a first convex portion coupled to the first side, a second convex portion coupled to the second side and a concave portion that interconnects the first convex portion and the second convex portion.

6. The system of claim 1, wherein the pin has a first pin end opposite a second pin end, and the second pin end comprises the portion of the perimeter of the pin.

7. The system of claim 6, wherein the pin further comprises a pin coupling flange at the second pin end, and the pin coupling flange comprises the portion of the perimeter of the pin.

8. The system of claim 7, wherein the pin further comprises a first pin coupling flange defined between the first pin end and the second pin end, and the first pin coupling flange couples the pin to the bore.

9. The system of claim 1, wherein the load spreader is received within the pocket.

10. A system for coupling a shroud to a case associated with a gas turbine engine, comprising:
the case defining a bore;
the shroud retained within the case, the shroud defining a pocket;
a pin received through the bore and at least partially positioned within the pocket, the pin having a perimeter, the pin is composed of a first material and the shroud is composed of a second material; and
a load spreader including a first side and a second side opposite the first side, with the first side interconnected to the second side by a flexible portion, the first side, the second side and the flexible portion received about a portion of the perimeter of the pin, the load spreader configured to transmit at least one of an axial point load and a circumferential point load from the pin over a surface of the shroud, the load spreader is composed of a third material, and the first material, the second material and the third material are different.

11. The system of claim 10, wherein the flexible portion includes one or more undulations.

12. A gas turbine engine, comprising:
a case defining a bore;
a shroud retained within the case, the shroud defining a pocket;
a pin received through the bore and at least partially positioned within the pocket, the pin is composed of a first material and the shroud is composed of a second material; and
a load spreader positioned within the pocket to surround a portion of the pin, the load spreader including a first side, a second side opposite the first side, a flexible portion that interconnects the first side to the second side and a fourth side, at least the first side, the second side and the fourth side configured to contact the portion of the pin to transmit at least one of an axial point load and a circumferential point load from the pin over a surface of the shroud, the load spreader is composed of a third material, and the first material, the second material and the third material are different.

13. The gas turbine engine of claim 12, wherein the pocket includes a first sidewall, a second sidewall, a third sidewall opposite the first sidewall and a fourth sidewall opposite the second sidewall, the fourth sidewall spaced apart from the first sidewall to define an opening, and the load spreader is positioned within the pocket such that the first side is adjacent to the first sidewall and the second side of the load spreader is adjacent to the third sidewall.

14. The gas turbine engine of claim 12, wherein the fourth side of the load spreader is substantially co-planar with the first side of the load spreader.

15. The gas turbine engine of claim 12, wherein the fourth side of the load spreader extends a distance beyond the first side of the load spreader.

16. The gas turbine engine of claim 12, wherein the fourth side of the load spreader is spaced apart from the first side to define a gap.

17. The gas turbine engine of claim 12, wherein the bore comprises a plurality of bores defined about a perimeter of the case, the pocket comprises a plurality of pockets defined about a perimeter of the shroud, the pin comprises a plurality of pins and the load spreader comprises a plurality of load spreaders, with each pin of the plurality of pins associated with a respective one of the plurality of the bores, and each load spreader of the plurality of load spreaders is associated with an alternate one of the plurality of pins about the perimeter of the shroud.

18. The gas turbine engine of claim 12, wherein the flexible portion comprises a first convex portion coupled to the first side, a second convex portion coupled to the second side and a concave portion that interconnects the first convex portion and the second convex portion.

19. The gas turbine engine of claim 12, wherein the pin has a first pin end opposite a second pin end, the second pin end includes a pin coupling flange, and the pin coupling flange is configured to contact at least the first side, the second side and the fourth side of the load spreader.

* * * * *